(12) United States Patent
Gilles et al.

(10) Patent No.: US 9,054,381 B2
(45) Date of Patent: Jun. 9, 2015

(54) SI BASED NEGATIVE ELECTRODE MATERIAL

(75) Inventors: Michael Gilles, Geel (BE); Kris Driesen, Hasselt (BE); Stijn Put, Olmen (BE)

(73) Assignee: Umicore, Brussels (BE)

( * ) Notice: Subject to any disclaimer, the term of this patent is extended or adjusted under 35 U.S.C. 154(b) by 107 days.

(21) Appl. No.: 13/881,796

(22) PCT Filed: Oct. 27, 2011

(86) PCT No.: PCT/EP2011/068828
§ 371 (c)(1),
(2), (4) Date: May 24, 2013

(87) PCT Pub. No.: WO2012/055948
PCT Pub. Date: May 3, 2012

(65) Prior Publication Data
US 2013/0234074 A1     Sep. 12, 2013

Related U.S. Application Data

(60) Provisional application No. 61/408,118, filed on Oct. 29, 2010.

(30) Foreign Application Priority Data

Dec. 16, 2010   (EP) ..................... 10015716

(51) Int. Cl.
*H01B 1/06*   (2006.01)
*H01M 4/134*   (2010.01)
(Continued)

(52) U.S. Cl.
CPC ................ *H01M 4/583* (2013.01); *H01B 1/06* (2013.01); *B22F 1/0011* (2013.01); *B22F 9/04* (2013.01);
(Continued)

(58) Field of Classification Search
CPC ........... H01B 1/04; H01B 1/06; H01M 4/134; H01M 4/1395
USPC ................... 252/520.1, 520.22, 521.2, 521.3; 429/223
See application file for complete search history.

(56) References Cited

U.S. PATENT DOCUMENTS 7,658,863 B2 *   2/2010   Aramata et al. ........... 252/182.1
2006/0115734 A1   6/2006   Ishihara et al.
(Continued)

FOREIGN PATENT DOCUMENTS

EP   2 197 040        6/2010
EP   2 242 129 A1   10/2010
(Continued)

OTHER PUBLICATIONS

Wang et al., "Grain Refining Action of Ti Existing in Electrolytic Low-Titanium Aluminum with A1-4B Addition for Superheated A1 Melt," Transactions of Nonferrous Metals Society of China, Central South University of Technology, Changsha, CN, vol. 20, No. 6, Jun. 1, 2010, pp. 950-957.
International Search Report, issued in PCT/EP2011/068828, dated Jan. 30, 2012.

*Primary Examiner* — Mark Kopec
(74) *Attorney, Agent, or Firm* — Brinks Gilson & Lione

(57) ABSTRACT

A negative electrode active material for a lithium ion battery having the composition formula $Si_aSn_bNi_cTi_yM_mC_z$, wherein a, b, c, y, m and z represent atomic % values, wherein M is either one of more of Fe, Cr and Co, and wherein a>0, b>0, z>0, y≥0, 0≤m≤1, c>5, z+0.5*b>a and c+y>0.75*b. The process for preparing the active material comprises the steps of: —providing a mixture of elemental and/or alloyed powders of the elements in the composition $Si_aSn_bNi_cTi_yM_mC_z$, and —high energy milling under non-oxidizing conditions of the powder mixture.

14 Claims, 2 Drawing Sheets

Figure 1:
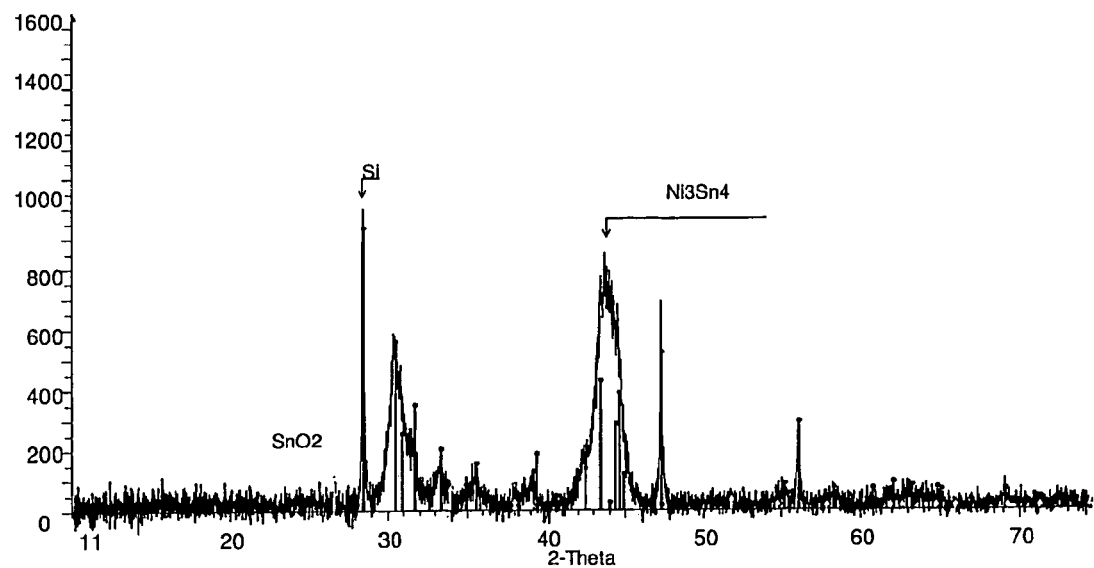

(51) Int. Cl.
  *H01M 4/1395* (2010.01)
  *H01M 4/583* (2010.01)
  *B22F 1/00* (2006.01)
  *B22F 9/04* (2006.01)
  *C22C 13/00* (2006.01)
  *C22C 19/00* (2006.01)
  *C22C 19/07* (2006.01)
  *H01M 4/38* (2006.01)
  *H01M 10/0525* (2010.01)

(52) U.S. Cl.
  CPC ................. *C22C 13/00* (2013.01); *C22C 19/00* (2013.01); *C22C 19/07* (2013.01); *H01M 4/134* (2013.01); *H01M 4/38* (2013.01); *H01M 10/0525* (2013.01); *Y02E 60/122* (2013.01)

(56) References Cited

U.S. PATENT DOCUMENTS

| | | |
|---|---|---|
| 2007/0224508 A1 | 9/2007 | Aramata et al. |
| 2009/0305131 A1* | 12/2009 | Kumar et al. ................. 429/206 |
| 2010/0119942 A1 | 5/2010 | Kumar |
| 2010/0270497 A1 | 10/2010 | Hezeque et al. |

FOREIGN PATENT DOCUMENTS

| | | |
|---|---|---|
| TW | 200635114 A | 10/2006 |
| TW | 200746518 A | 12/2007 |
| WO | WO 2007/120347 | 10/2007 |

* cited by examiner

SI BASED NEGATIVE ELECTRODE MATERIAL

This application is a National Stage application of International Application No. PCT/EP2011/068828, filed Oct. 27, 2011, which claims the benefit of U.S. Provisional Application No. 61/408,118, filed Oct. 29, 2010. This application also claims priority under 35 U.S.C. §119 to European Patent Application No. 10015716.3, filed Dec. 16, 2010.

TECHNICAL FIELD AND BACKGROUND

Portable electronic devices are becoming smaller, lighter and sometimes more energy demanding. This has led to an increase of interest in high-capacity and compact batteries. Non-aqueous electrolyte lithium-ion batteries are regarded as one of the most promising technologies for these applications. During lithiation, a lithium is added to the active material, during delithiation a lithium ion is removed from the active material. Most of the currently applied anodes in the lithium ion batteries function by a lithium intercalation and de-intercalation mechanism during charging and discharging. Examples of such materials are graphite and lithium titanium oxide (LTO). However these active anode materials lack high gravimetric and volumetric capacity. The gravimetric capacity of graphite and LTO is 372 mAh/g ($LiC_6$) and 175 mAh/g ($Li_4Ti_5O_{12}$) respectively.

Another class of active materials functions by alloying and de-alloying lithium with a metal, metal alloy or a composite metal alloy. The term metal can refer to both metals and metalloids. Several good examples are pure silicon, pure tin or amorphous CoSn alloy that is commercialized by Sony as Nexelion. Problems with the application of lithium alloying type of electrodes is mainly related to the continuous expansion and decrease in volume of the particles or by unwanted phase changes during cycling. Repeated expansion and contraction of the particle volume can create contact loss between the particles and current collector, a decomposition of the electrolyte due to a repeated exposure to a fresh particle surface as the volume changes, a pulverization or cracking of the particle due to internal stress. Phase changes during long term cycling also have an influence. After lithiating pure silicon to the $Li_{15}Si_4$ phase the cycling is no longer reversible. Also a presence or creation of a crystalline free tin phase instead of a tin-transition metal alloy phase after delithiation during long term cycling deteriorates the capacity.

The object of this present invention is to provide a negative electrode material for non-aqueous electrolyte secondary batteries with a high capacity and long cycling life.

SUMMARY

Viewed from a first aspect, the invention can provide a negative electrode active material for a lithium ion battery having the composition formula $S_rSn_bNi_cTi_yM_mC_z$, wherein a, b, c, m, y and z represent atomic % values, wherein M is either one or more of Fe, Cr and Co, and wherein a>0, b>0, z>0, y≥0, c>5, 0≤m≤1, z+0.5*b>a and c+y>0.75*b. In one embodiment y>0. In another embodiment the Si content is defined by 0<a≤45. In still another embodiment z>a. The active material can have a theoretical volume increase of less than 200% upon charging. In one embodiment at least 99 at % of the negative electrode material consists of $Si_aSn_bNi_cTi_yC_z$, wherein a>0, b>0, z>0, y≥0, c>5, z+0.5*b>a and c+y>0.75*b. In another embodiment the negative electrode active material for a lithium ion battery has the composition formula $Si_aSn_bNi_cTi_yC_z$, wherein a, b, c, y and z represent atomic % values, wherein M is Ti, and wherein a>0, b>0, z>0, y≥0, c>5, z+0.5*b>a and c+y>0.75*b.

Viewed from a second aspect, the invention can provide a process for preparing the negative electrode active material described above, comprising the steps of:
  providing a mixture of elemental and/or alloyed powders of the elements in the composition $Si_aSn_bNi_cTi_yM_mC_z$, and
  high energy milling under non-oxidizing conditions of the powder mixture. In one embodiment the composition is $Si_aSn_bNi_cM_yC_z$, with M=Ti.

In one embodiment the high energy milling takes place in a protective atmosphere of a gas comprising either one or more of Ar, $N_2$, CO and $CO_2$. In another embodiment the high energy milling takes place in a protective atmosphere of a gas consisting of either one or more of Ar, $N_2$, CO and $CO_2$. In yet another embodiment the high energy milling is performed in either a horizontal or a vertical attritor. In still another embodiment Sn and Ni are provided as either one or more of an atomized SnNi alloy, preferably an atomized brittle SnNi alloy, and a $Ni_3Sn_4$ compound, preferably an atomized $Ni_3Sn_4$ compound. In another embodiment Sn, Ti and Ni are provided as an atomized $Ni_3Sn_4$—Ti alloy. C can be provided as carbon black. The process described above can further comprise the step of adding graphite or conductive carbon to the high energy milled mixture.

It is appropriate to mention that in WO2007/120347 an electrode composition $Si_aSn_bM_yC_z$ is disclosed, where M can be Ti, with a+b>2y+z. Expressed in terms of the composition in the present application ($Si_aSn_bNi_cTi_yC_z$), this means a+b>2*(c+y)+z. In the present application however, since z+0.5*b>a and c+y>0.75*b; this implies that also z+0.75*b>a+0.25*b; and since c+y>0.75*b this implies that z+c+y>a+0.25*b; which is the same as z+c+y+0.75*b>a+b; and hence a+b<2*(c+y)+z (again since c+y>0.75*b). The negative impact of increased amounts of both Si and Sn in WO2007/120347 is discussed below.

In US2010-0270497 alloys of the type $Si_aSn_bC_cAl_dM_e$ are disclosed, M being for example Ni, Fe or Cu. However, it was found in the present application that the presence of Al has a negative influence on the capacity retention of the active material. Also, there is no disclosure of a $Si_aSn_bC_cM_e$ composition meeting the requirements that M=Ni, a+b+c+e=1, and the additional limitations as defined in the main claim of the present application. In the present application z+0.5*b>a, or even z>a, whereas in US2010-0270497, for every alloy comprising Ni, z≤a. This means that in the present application the content of Si can be lowered and still anode compositions with superior capacity retention are obtained. The problems associated with volume expansion upon battery charging are therefore avoided.

BRIEF INTRODUCTION TO THE DRAWINGS

FIG. 1: X-ray diffraction pattern of a Si—Sn—Ni—Al—C alloy (counter example 1)
FIG. 2: X-ray diffraction pattern of a Si—Sn—Ni—C alloy
FIG. 3: X-ray diffraction pattern of a Si—Sn—Ni—Ti—C alloy
FIG. 4: Capacity of active material (mAh/g) versus cycle number (N) for the alloys described in the Examples

DETAILED DESCRIPTION

We describe the negative electrode active material for a lithium ion anode material having the composition formula $Si_aSn_bNi_cTi_yM_mC_z$, where a, b, c, y, m and z represent atomic percent values (with a+b+c+y+m+z=100). In one embodiment M is one or more elements selected from the group consisting of iron, chromium and cobalt. These elements are typically found as impurities in the alloy after the milling operation. Also: a>0, b>0, z>0, y≥0, 0≤m≤1, c>5, z+0.5*b>a and c+y>0.75*b.

Silicon is used in the active material to increase the capacity as it has a gravimetric capacity of around 3570 mAh/g. In one embodiment silicon is present in the alloy composition in an amount of maximum 45 atomic percent. A high amount of silicon in the active material may increase the amount of volume expansion that has to be buffered in the final negative electrode to a level that is not achievable and hence may lead to capacity loss and premature failure of the batteries.

Silicon is present as very small crystalline or semi-crystalline particles. The reason is that before a battery can be used in the final application the battery is "conditioned" in the first charging and discharging steps. During this conditioning step a very low potential of 0-30 mV versus a lithium reference electrode is applied, rendering the crystalline silicon partially amorphous. A higher crystallinity may require a different material conditioning step. After the conditioning of the silicon—during the normal operation—a higher potential is used to introduce a stable cycling. If the silicon is cycled to low voltages versus a lithium reference electrode during the operation of the electrode (after conditioning) a $Li_{15}Si_4$ phase may be formed that will no longer be available for a reversible cycling. Depending on the amount and type of electrolyte or electrolyte additives the normal cycling, after conditioning, may be limited around 45 mV to 80 mV versus a metallic lithium reference electrode.

Tin is used in the alloy for its high electrochemical capacity and good conductivity. High levels of tin increase the rate of lithiation and improve the capacity of the active material but elemental tin formation should be avoided. Larger free crystalline tin particles may also be created and grown during de-lithiation instead of the electrochemical more reversible tin-transition metal alloy phase. Therefore it is provided to create a small and stable reversible tin alloy particle.

The composite anode active materials according to the invention comprise nickel. Nickel is added as a metallic binder between tin and the metalloid silicon that has a lower conductivity. Milling or handling of ductile tin is also improved by alloying with nickel. To improve the milling it may be convenient to start with brittle intermetallic compounds like $Ni_3Sn_4$ alloy instead of pure nickel metal. In certain embodiments, other elements may be added to enhance the cyclability of the alloy compound. These metals or metalloids may be added in combination with nickel. When titanium is added it acts also as a grain refiner.

Conductive carbon is added in the preparation method to act as a lubricant, to boost conductivity and to avoid loss of interparticle electrical contact and contact with the collector during cycling of the active material. At high silicon and tin contents an increased amount of carbon may be added to improve the milling. The BET of conductive carbon—like the commercially available C-Nergy65 (Timcal)—is more than 50 m²/g and this contributes to an increase of irreversible capacity. When conductive carbon is used during the milling the BET decreases significantly in function of the milling time and parameters. When however natural or synthetic graphite is used during the milling, the BET increases. During milling silicon carbide may be formed in small quantities, which can be avoided, as the silicon in silicon carbide does not alloy with Li and hence reduces the specific capacity of the powder.

The nickel and, if present, titanium are added in a sufficient amount versus the tin content to form an intermetallic phase that binds all of the tin and optimizes the cyclability of the tin phase. In one embodiment the sum of the atomic percentages c+y is larger than 0.75*b. Also, in another embodiment, the total amount of tin phase and carbon in the milling step is sufficient to accommodate the expansion of silicon in a conductive matrix of active anode powder; which is obtained when either condition z+0.5*b>a or z>a is satisfied.

In an embodiment extra graphite or conductive carbon may be added to the $Si_aSn_bNi_cTi_yM_mC_z$ active material in the preparation of the electrode. The carbonaceous compounds assist in buffering the material expansion and maintain the conductive properties of the complete electrode. To prepare the negative electrode the active material may not only be combined with conductive additives but also with a suitable binder. This binder enhances the integrity of the complete composite electrode, including the adhesion to the current collector, and contributes to buffering the continuous expansion and decrease in volume. In literature a lot of suitable binders are described. Most of these binders are either n-methyl-pyrrolidone or water based. Possible binders include but are not limited to polyimides, polytetrafluoroethylenes, polyethylene oxides, polyacrylates or polyacrylic acids, celluloses, polyvinyldifluorides.

The electrolyte used in the battery is enabling the functioning of the active material. For example, a stable solid-electrolyte interphase (SEI) that protects the silicon surface is created. Electrolyte additives like VC, FEC or other fluorinated carbonates create a stable and flexible SEI barrier that allows lithium diffusion and avoid the decomposition of electrolyte. If the SEI layer is not flexible, the continuous expansion of e.g. the silicon containing particles induces a continuous decomposition of electrolyte at the silicon surface. The electrolyte can also be in the form of a solid or gel.

The invention is further illustrated in the following examples:

COUNTER EXAMPLE 1

$Ni_3Sn_4$ powder, Si powder, Al powder and carbon (C-Nergy65, Timcal) are milled in a horizontal attritor (Simoloyer® cm01 from ZOZ, Wenden). To prevent oxidation, milling is done under argon gas atmosphere. The composition and the process conditions are given in Table 1. The values for the composition parameters a, b, c, y (where Ti has been replaced by Al in the general formula) and z are given in Table 8.

TABLE 1

Experimental conditions of Counter Example 1

|  | Comments | Qty |
|---|---|---|
| $Ni_3Sn_4$ | Prepared in the lab | 47.29 g |
| Si | Keyvest Si 0-50 μm | 12.53 g |
| Al | Merck 808 K3696756 | 1.40 g |
| Carbon Black | Timcal C-Nergy 65 | 7.43 g |
| Total powder |  | 68.65 g |
| Balls | Ø5 mm, hardened steel 100Cr6 | 1373 g |
| BPR (balls/powder) |  | 20 |
| Filling degree mill |  | 38 vol % |
| Milling time (h) | 20 h |  |
| Rotation speed (rpm) | 700 rpm |  |

After milling, the powders are passivated in a controlled air flow to avoid excessive oxidation. Powder properties are given in Table 3, and the XRD is shown in FIG. 1 (all XRD figures show counts per second vs. 2θ). The composite negative electrodes are prepared using 55 wt % of this milled powder, 25 wt % Na-CMC binder (MW<200 k) and 20 wt % conductive additive (C-Nergy65, Timcal). A 4 wt % Na-CMC binder solution in water is prepared and mixed overnight. The conductive carbon is added and mixed at high shear with the binder solution. After dissolving the carbon the active material is added. The paste is rested and coated on a copper foil (17 μm) using 120 and 230μm wet thickness. The electrodes are dried overnight.

Round electrodes are punched and dried above 100° C. using vacuum. The electrodes are electrochemically tested versus metallic lithium using coin cells prepared in a glove-box (dry Ar atmosphere). The electrochemical evaluation of the different alloys is performed in half coin cells (using metallic lithium as counter electrode). The first two cycles are performed at a slow speed (using a rate of C/20, meaning a charge or discharge of 1 Ah/g of active material in 20 h), using cut-off voltages of 0V in lithiation step for the first cycle and 10 mV for the second one and 2V in delithiation step for both cycles. Cycles 3 and 4 are performed using a C-rate of C/10 (meaning a charge or discharge of 1 Ah/g of active material in 10 h) and cut-off voltages of 70 mV in lithiation step and 2V in delithiation step. These cut-off voltages then remain the same for the rest of the test.

Then, the 48 next cycles are performed at a faster speed (using a rate of 1C, meaning a charge or discharge of 1 Ah/g of active material in 1 h). The $54^{th}$ and $55^{th}$ cycles are performed at a slower speed again (C/10) in order to evaluate the remaining capacity of the battery. From then on, periods of fast cycling (at 1 C) during 48 cycles and slow cycling (at C/10) during 2 cycles alternate (48 fast cycles, 2 slow cycles, 48 fast cycles, 2 slow cycles, etc . . . ). This method allows a fast and reliable electrochemical evaluation of the alloys.

Table 1a gives the details of the cycling sequence.

TABLE 1a (valid for all Examples)

| Cycle # | C-rate | Cut-off voltages |
|---|---|---|
| 1 | C/20 | 0 V/2 V |
| 2 | C/20 | 10 mV/2 V |
| 3 + 4 | C/10 | 70 mV/2 V |
| 5 to 53 | 1C | 70 mV/2 V |
| 54 + 55 | C/10 | 70 mV/2 V |
| 56 to 104 | 1C | 70 mV/2 V |
| 105 + 106 | C/10 | 70 mV/2 V |
| 107 to 155 | 1C | 70 mV/2 V |
| 156 + 157 | C/10 | 70 mV/2 V |
| Etc . . . | | |

Figure 4:
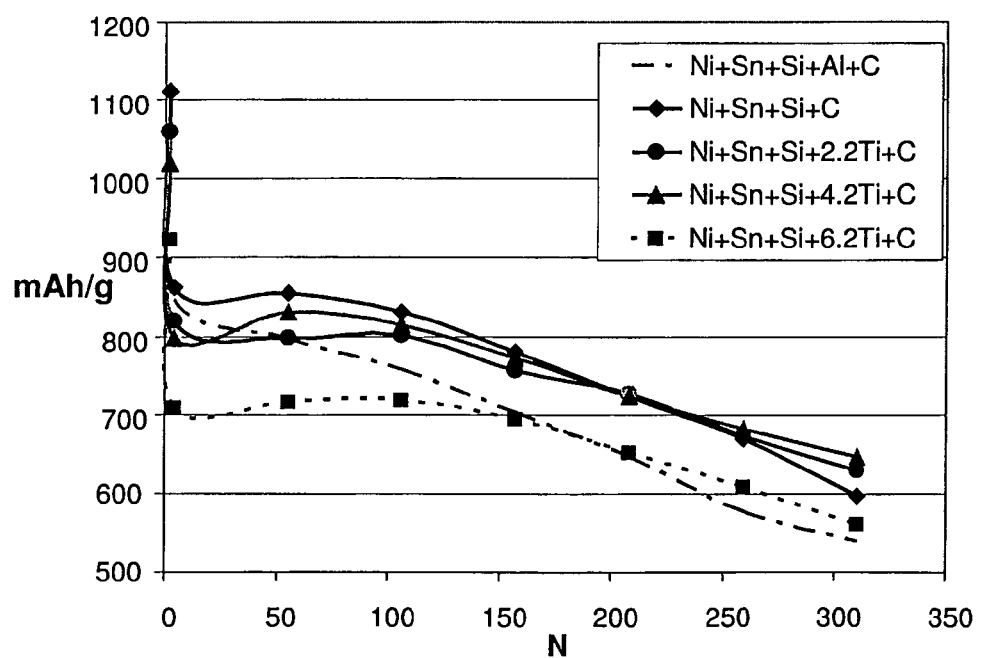

The electrochemical results for Comp. Ex 1 are shown in FIG. 4 (capacity given against cycle number). On the graph, the points displayed correspond to cycles 2 and 4 and the $2^{nd}$ cycle of each relaxation period (at C/10), i.e. cycles 2, 4, 55, 106, 157, 208, 259 and 310. It can be seen that for the Al-containing material the capacity slowly deteriorates during cycling.

EXAMPLE 2 (y=0)

$Ni_3Sn_4$ powder, Si powder, and carbon black are milled for 8 h at 1400 rpm in a horizontal attritor (Simoloyer® cm01 from ZOZ, Wenden). To prevent oxidation, milling is done under argon gas atmosphere. The composition and the process conditions are given in Table 2. The values for the composition parameters a, b, c and z are given in Table 8.

TABLE 2

Experimental conditions of Example 2

| | Comments | Qty |
|---|---|---|
| $Ni_3Sn_4$ | Prepared in the lab | 44.85 g |
| Si | Si 0-50 μm, Keyvest | 14.13 g |
| Carbon Black | Timcal C-Nergy 65 | 8.52 g |
| Total powder | | 67.5 g |
| Balls | Ø5 mm, hardened steel 100Cr6 | 1350 g |
| BPR (balls/powder) | | 20 |
| Filling degree mill | | 38 vol % |
| Milling time (h) | 8 h | |
| Rotation speed (rpm) | 1400 rpm | |

Figure 2:
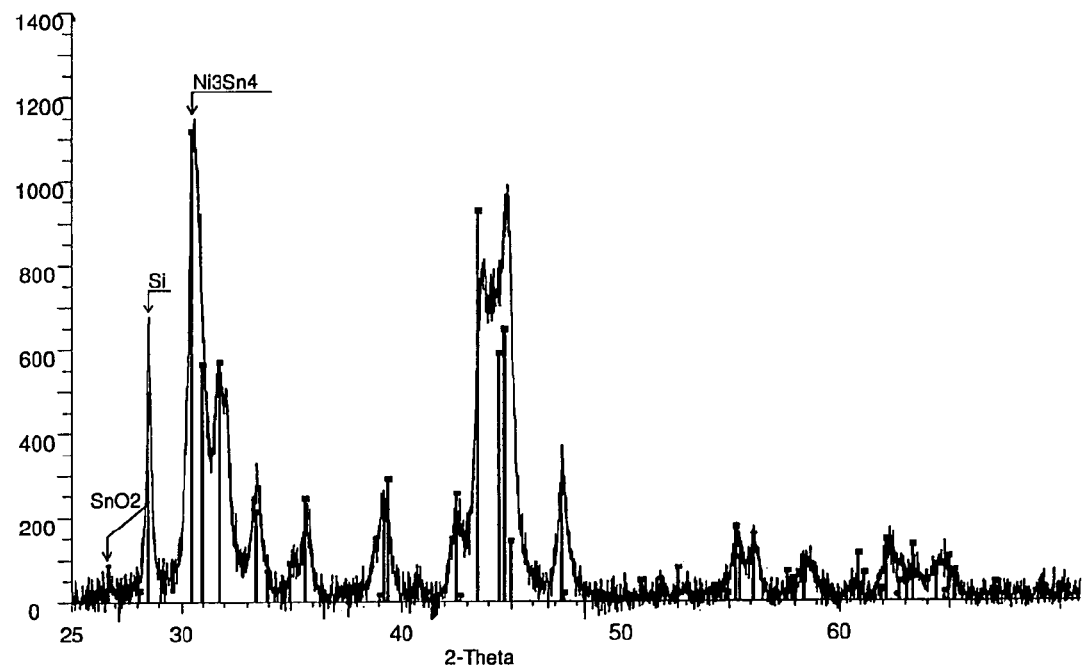

After milling, the powders are passivated in a controlled air flow to avoid excessive oxidation. Powder properties are given in Table 3, and the XRD is shown in FIG. 2.

Further processing and coin cell preparation is done as in Counter Example 1. The electrochemical results are shown in FIG. 4. The capacity retention during cycling is superior to Counter Example 1.

TABLE 3

Properties of powders prepared in Examples 1-2

| | | Counter Ex 1 | Example 2 |
|---|---|---|---|
| Particle size d50 (μm) | | 3.79 | 5.40 |
| Oxygen content (wt %) | | 2.0% | 1.7% |
| BET ($m^2$/g) | | 18.00 | 5.75 |
| Theoretical capacity (mAh/g) | | 1201 | 1200 |
| Capacity $2^{nd}$ cycle (mAh/g) | C/20-10 mV | 1074 | 1112 |
| Capacity $4^{th}$ cycle (mAh/g) | C/10-70 mV | 847 | 863 |
| Capacity $106^{th}$ cycle (mAh/g) | C/10-70 mV | 758 (90%) | 831 (96%) |
| Capacity $208^{th}$ cycle (mAh/g) | C/10-70 mV | 647 (76%) | 724 (84%) |
| Capacity $310^{th}$ cycle (mAh/g) | C/10-70 mV | 539 (64%) | 597 (69%) |

In the Table (and also in Table 7 below), for each alloy, the capacities at cycles 2, 4, 106, 208 and 310 are given and the corresponding capacity retention vs. cycle 4 (performed at C/10 with 70 mV cut-off voltage) is calculated.

EXAMPLE 3

$Ni_3Sn_4$ powder, Si powder, Ti powder and carbon black are milled for 8 h at 1400 rpm in a horizontal attritor (Simoloyer® cm01 from ZOZ, Wenden). To prevent oxidation, milling is done under argon gas atmosphere. The composition and the process conditions are given in Table 4. The values for the composition parameters a, b, c, y and z are given in Table 8.

TABLE 4

Experimental conditions of Example 3

| | Comments | Qty |
|---|---|---|
| $Ni_3Sn_4$ | Prepared in the lab | 50.75 g |
| Si | Si 0-50 μm, Keyvest | 15.81 g |
| Ti | Spherical powder, 100 mesh, Aldrich | 2.00 g |
| Carbon Black | Timcal C-Nergy 65 | 9.50 g |
| Total powder | | 78.06 g |
| Balls | Ø5 mm, hardened steel 100Cr6 | 1600 g |
| BPR (balls/powder) | | 20 |

TABLE 4-continued

Experimental conditions of Example 3

|  | Comments | Qty |
|---|---|---|
| Filling degree mill |  | 44 vol % |
| Milling time (h) | 8 h |  |
| Rotation speed (rpm) | 1400 rpm |  |

After milling, the powders are passivated in a controlled air flow to avoid excessive oxidation. Powder properties are given in Table 7.

Further processing and coin cell preparation is done as in Counter Example 1. The electrochemical results are shown in FIG. 4. The capacity retention during cycling is superior to Counter Example 1 and Example 2.

EXAMPLE 4

$Ni_3Sn_4$ powder, Si powder, Ti powder and carbon black are milled for 8 h at 1400 rpm in a horizontal attritor (Simoloyer® cm01 from ZOZ, Wenden). To prevent oxidation, milling is done under argon gas atmosphere. The composition and the process conditions are given in Table 5. The values for the composition parameters a, b, c, y and z are given in Table 8.

TABLE 5

Experimental conditions of Example 4

|  | Comments | Qty |
|---|---|---|
| $Ni_3Sn_4$ | Prepared in the lab | 50.75 g |
| Si | Si 0-50 μm, Keyvest | 15.81 g |
| Ti | Spherical powder, 100 mesh, Aldrich | 4.00 g |
| Carbon Black | Timcal C-Nergy 65 | 9.50 g |
| Total powder |  | 80.06 g |
| Balls | Ø5 mm, hardened steel 100Cr6 | 1600 g |
| BPR (balls/powder) |  | 20 |
| Filling degree mill |  | 44 vol % |
| Milling time (h) | 8 h |  |
| Rotation speed (rpm) | 1400 rpm |  |

Figure 3:
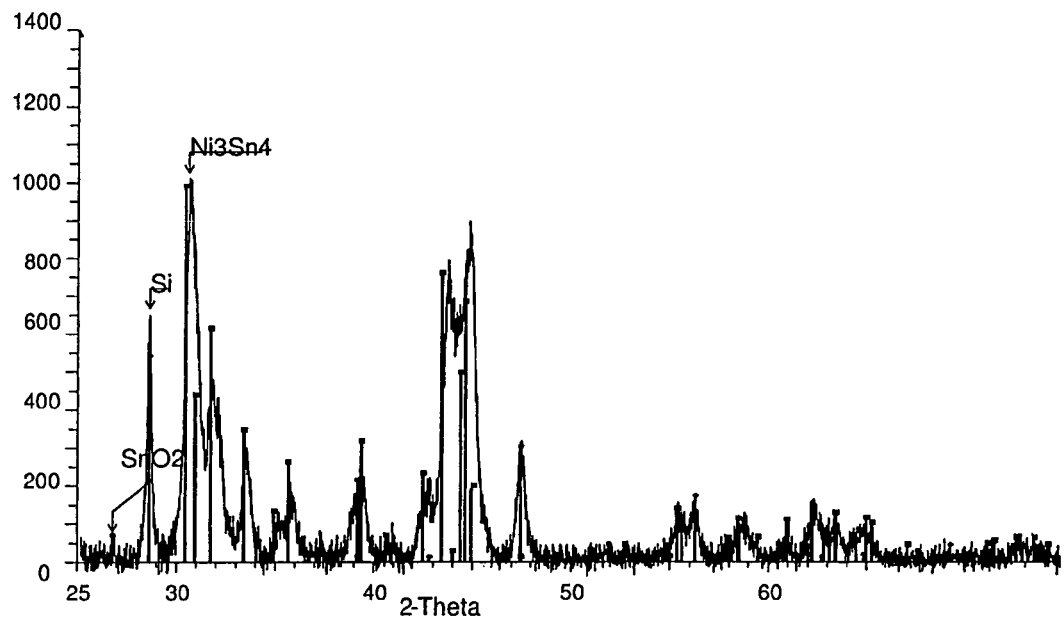

After milling, the powders are passivated in a controlled air flow to avoid excessive oxidation. Powder properties are given in Table 7, and the XRD is shown in FIG. 3.

Further processing and coin cell preparation is done as in Counter Example 1. The electrochemical results are shown in FIG. 4. The capacity retention during cycling is superior to Counter Example 1 and Example 2.

EXAMPLE 5

$Ni_3Sn_4$ powder, Si powder, Ti powder and carbon black are milled for 8 h at 1400 rpm in a horizontal attritor (Simoloyer® cm01 from ZOZ, Wenden). To prevent oxidation, milling is done under argon gas atmosphere. The composition and the process conditions are given in Table 6. The values for the composition parameters a, b, c, y and z are given in Table 8.

TABLE 6

Experimental conditions of Example 5

|  | Comments | Qty |
|---|---|---|
| $Ni_3Sn_4$ | Prepared in the lab | 50.75 g |
| Si | Si 0-50 μm, Keyvest | 15.81 g |
| Ti | Spherical powder, 100 mesh, Aldrich | 6.00 g |
| Carbon Black | Timcal C-Nergy 65 | 9.50 g |
| Total powder |  | 82.06 g |
| Balls | Ø5 mm, hardened steel 100Cr6 | 1600 g |
| BPR (balls/powder) |  | 20 |
| Filling degree mill |  | 44 vol % |
| Milling time (h) | 8 h |  |
| Rotation speed (rpm) | 1400 rpm |  |

After milling, the powders are passivated in a controlled air flow to avoid excessive oxidation. Powder properties are given in Table 7.

Further processing and coin cell preparation is done as in Counter Example 1. The electrochemical results are shown in FIG. 4. The capacity retention during cycling is superior to Counter Example 1 and Example 2.

TABLE 7

Properties of powders prepared in Examples 3-5

|  |  | Example 3 | Example 4 | Example 5 |
|---|---|---|---|---|
| Particle size d50 (μm) |  | 5.43 | 5.38 | 5.3 |
| Oxygen content (wt %) |  | 1.6% | 1.8% | 1.8% |
| BET (m²/g) |  | 7.5 | 6.4 | 5.8 |
| Theoretical capacity (mAh/g) |  | 1190 | 1161 | 1132 |
| Capacity $2^{nd}$ cycle (mAh/g) | C/20-10 mV | 1060 | 1020 | 923 |
| Capacity $4^{th}$ cycle (mAh/g) | C/10-70 mV | 819 | 798 | 709 |
| Capacity $106^{th}$ cycle (mAh/g) | C/10-70 mV | 802 (98%) | 815 (102%) | 719 (102%) |
| Capacity $208^{th}$ cycle (mAh/g) | C/10-70 mV | 727 (89%) | 724 (91%) | 652 (92%) |
| Capacity $310^{th}$ cycle (mAh/g) | C/10-70 mV | 630 (77%) | 648 (81%) | 560 (79%) |

TABLE 8

Values of composition parameters of powders prepared in Examples 1-5

| At % | a (Si) | b (Sn) | c (Ni) | y | z (C) |
|---|---|---|---|---|---|
| Counter example 1 | 29.0% | 16.0% | 12.0% | Al: 3% | 40.0% |
| Example 2 | 29.6% | 16.2% | 12.2% | 0.0% | 42.0% |
| Example 3 | 29.0% | 16.1% | 12.0% | Ti: 2.2% | 40.7% |
| Example 4 | 28.4% | 15.7% | 11.8% | Ti: 4.2% | 39.9% |
| Example 5 | 27.8% | 15.4% | 11.6% | Ti: 6.2% | 39.1% |

In certain embodiments according to the invention, $25 \leq a \leq 35$, $10 \leq b \leq 20$, $10 \leq c < 15$, $1 \leq y \leq 10$ and $35 \leq z \leq 45$. Also embodiments may have $25 \leq a \leq 30$, $15 \leq b \leq 18$, $10 \leq c \leq 12.5$, $2 \leq y \leq 8$ and $37 \leq z \leq 43$. In all experiments traces of either one or more of Fe, Co and Cr can be found resulting from the milling equipment, as expressed by $0 \leq m \leq 1$. The value of m is however not taken into account in the analysis in Table 8.

The invention claimed is:

1. A negative electrode active material for a lithium ion battery having the composition formula $Si_aSn_bNi_cTi_yM_mC_z$, wherein a, b, c, y, m and z represent atomic % values, wherein M is either one or more of Fe, Cr and Co, and wherein a>0, b>0, z>0, y≥0, 0≤m≤1, c>5, z+0.5*b >a and c +y>0.75*b.

2. The active material of claim 1, wherein 0<a≤45.

3. The active material of claim 1, wherein y is between 3 and 12 at %.

4. The negative electrode active material of claim 1, wherein y>0.

5. A process for preparing the negative electrode active material according to claim 1, comprising:
   providing a mixture of elemental and/or alloyed powders of the elements in the composition $Si_aSn_bNi_cTi_yM_mC_z$, and
   performing high energy milling of the powder mixture under non-oxidizing conditions.

6. The process of claim 5, wherein the high energy milling is performed in a protective atmosphere of a gas, wherein the gas comprises one or more of Ar, $N_2$, CO or $CO_2$.

7. The process of claim 6, wherein the gas consists of Ar, $N_2$, CO and $CO_2$.

8. The process of claim 5, wherein the high energy milling is performed in either a horizontal or a vertical attritor.

9. The process of claim 5, wherein Sn and Ni are provided as either one or more of an atomized SnNi alloy.

10. The process of claim 9, wherein Sn and Ni are provided as either one or more of an atomized brittle SnNi alloy or a $Ni_3Sn_4$ compound.

11. The process of claim 10, wherein the $Ni_3Sn_4$ compound is an atomized $Ni_3Sn_4$ compound.

12. The process of claim 5, wherein Sn, Ti and Ni are provided as an atomized $Ni_3Sn_4Ti$ alloy.

13. The process of claim 5, wherein C is provided as carbon black.

14. The process of claim 5, further comprising the step of adding graphite or conductive carbon to the high energy milled mixture.

* * * * *